United States Patent [19]

Eastman et al.

[11] Patent Number: 5,264,647

[45] Date of Patent: Nov. 23, 1993

[54] ALKYLATION CATALYST REGENERATION

[75] Inventors: Alan D. Eastman; Bruce B. Randolph, both of Bartlesville, Okla.; Ronald G. Abbott, Kingwood, Tex.; Robert B. Eldridge, Bartlesville, Okla.

[73] Assignee: Phillips Petroleum Company, Bartlesville, Okla.

[21] Appl. No.: 953,384

[22] Filed: Sep. 30, 1992

[51] Int. Cl.$^5$ .................. C07C 2/62; C07C 7/10; C07C 7/12

[52] U.S. Cl. ...................... 585/724; 585/723; 585/802; 585/857; 585/823

[58] Field of Search .............. 585/723, 724, 802, 857

[56] References Cited

U.S. PATENT DOCUMENTS

| | | | |
|---|---|---|---|
| 3,795,712 | 3/1974 | Torck et al. | 585/724 |
| 4,014,953 | 3/1977 | Brown, Jr. | 585/724 |
| 4,058,575 | 11/1977 | Cahn et al. | 585/724 |
| 4,199,409 | 4/1980 | Skraba | 585/724 |
| 4,317,795 | 3/1982 | Makovec et al. | 422/62 |
| 4,663,026 | 5/1987 | Louie et al. | 585/723 |
| 4,783,567 | 11/1988 | Kocal | 585/464 |
| 5,191,150 | 3/1993 | Child et al. | 585/809 |

*Primary Examiner*—Asok Pal
*Attorney, Agent, or Firm*—Charles W. Stewart

[57] ABSTRACT

Described is a novel process for regenerating an ASO contaminated alkylation catalyst which contains a sulfone component and a hydrogen halide component. The alkylation catalyst undergoes a series of separation steps to remove a significant portion of the hydrogen halide component contained therein followed by a phase separation between an ASO phase and a sulfone phase. The sulfone phase is then contacted with a carbon material to remove a portion of any remaining ASO contained in the sulfone.

19 Claims, 2 Drawing Sheets

ALKYLATION CATALYST REGENERATION

The present invention relates to the regeneration of a catalyst composition utilized in a hydrocarbon conversion process. More particularly, the invention relates to the regeneration of a catalyst mixture, comprising a sulfone compound and a hydrogen halide compound, utilized in the alkylation of olefin hydrocarbons by isoparaffin hydrocarbons.

BACKGROUND OF THE INVENTION

It has recently been discovered that a mixture, comprising a sulfone compound and a hydrogen halide compound, is an effective catalyst for use in the alkylation of olefin hydrocarbons by isoparaffin hydrocarbons to produce an alkylate reaction product, or alkylate. The alkylate reaction product generally contains hydrocarbons having seven or more carbon atoms, and it is a highly desirable gasoline blending component because of its high octane value as a motor fuel.

While a process which utilizes a catalyst composition comprising a sulfone component and a hydrogen halide component produces an alkylate product of very high quality, one side effect from using such a process in the production of alkylate is the formation of certain polymeric reaction by-products such as those referred to as acid-soluble oils, or ASO. These polymeric reaction by-products are referred to as acid-soluble oils because they are soluble in the catalyst utilized in the alkylation process; and thus remain in the catalyst phase when the alkylate product resulting from the contact of a hydrocarbon mixture with an alkylation catalyst is separated from the alkylation catalyst. In an alkylation process which continuously separates the catalyst phase from the alkylation reaction product for reuse in the process reaction zone, there is a buildup of ASO in the catalyst. Over time the ASO concentration will reach unacceptable concentration levels if not removed. A low concentration of ASO in the alkylation catalyst comprising a sulfone component and a hydrogen halide component is believed to have a beneficial effect upon the alkylation process or its product. However, higher concentrations of ASO in the alkylation catalyst have an adverse effect upon the catalyst activity and the final alkylate end-product. An ASO concentration in the alkylation catalyst that exceeds certain acceptable limits will result in lowering the octane of the alkylate end-product with incremental increases in the ASO concentration causing incremental decreases in the alkylate octane.

In conventional alkylation processes that use hydrogen fluoride (HF) as a catalyst, as opposed to the use of the aforementioned novel catalyst comprising a sulfone component and a hydrogen halide component, there are certain known methods used to remove the ASO from the HF catalyst used in a continuous alkylation process. Particularly, enough of a portion of the HF catalyst that is utilized in the alkylation process is treated, or regenerated, so as to remove an amount of ASO at a rate that approximates the rate of accumulation of ASO in the alkylation catalyst. This is done by passing a portion of the HF catalyst to a stripping vessel whereby the HF is stripped from the ASO by means of a vaporous hydrocarbon such as isobutane with the HF passing as a part of the vaporous overhead stream from the stripping vessel and the ASO passing as a bottoms stream from the stripping vessel for further processing.

While the conventional alkylation catalyst regeneration techniques have worked well in the regeneration of the conventional HF catalyst, conventional means cannot be used to regenerate an alkylation catalyst mixture which includes a sulfone component. This is because the boiling range of ASO overlaps the boiling temperatures of certain sulfones such as sulfolane. Therefore, simple distillation techniques as are used to separate HF from ASO cannot be used to effectively regenerate a sulfone-containing alkylation catalyst. Additionally, it is necessary to separate ASO from the sulfone in order to reclaim the sulfone for reuse as a catalyst in the alkylation process.

SUMMARY OF THE INVENTION

It is therefore an object of this invention to provide a novel process for the removal of ASO from sulfone-containing mixtures, particularly, mixtures comprising a sulfone component and a hydrogen halide.

It is a further object of this invention to provide a novel process for the regeneration of alkylation catalysts.

A still further object of this invention is to provide a process for the removal of ASO from alkylation catalysts containing a sulfone component.

Thus, the process of the present invention relates to a process comprising separating a mixture, which comprises a sulfone component, a hydrogen halide component, and ASO, into a first overhead stream and a first bottoms stream. The first overhead stream will include at least a portion of the hydrogen halide component of the mixture, and the first bottoms stream will include at least a portion of the sulfone component of the mixture and at least a portion of the ASO of the mixture. The first bottoms stream is then separated into a second overhead stream and a second bottoms stream. The second overhead stream will include at least a portion of the hydrogen halide contained in the first bottoms stream, and the second bottoms stream will include at least a portion of the sulfone contained in the first bottoms stream and at least a portion of the ASO contained in the first bottoms stream. The second bottoms stream is then separated into an ASO stream, which comprises ASO, and a sulfone stream, which includes at least a portion of the sulfone contained in the second bottoms stream. The sulfone stream is contacted with carbon to thereby remove an amount of ASO so as to provide a sulfone stream having a reduced concentration of ASO.

Figure 1:
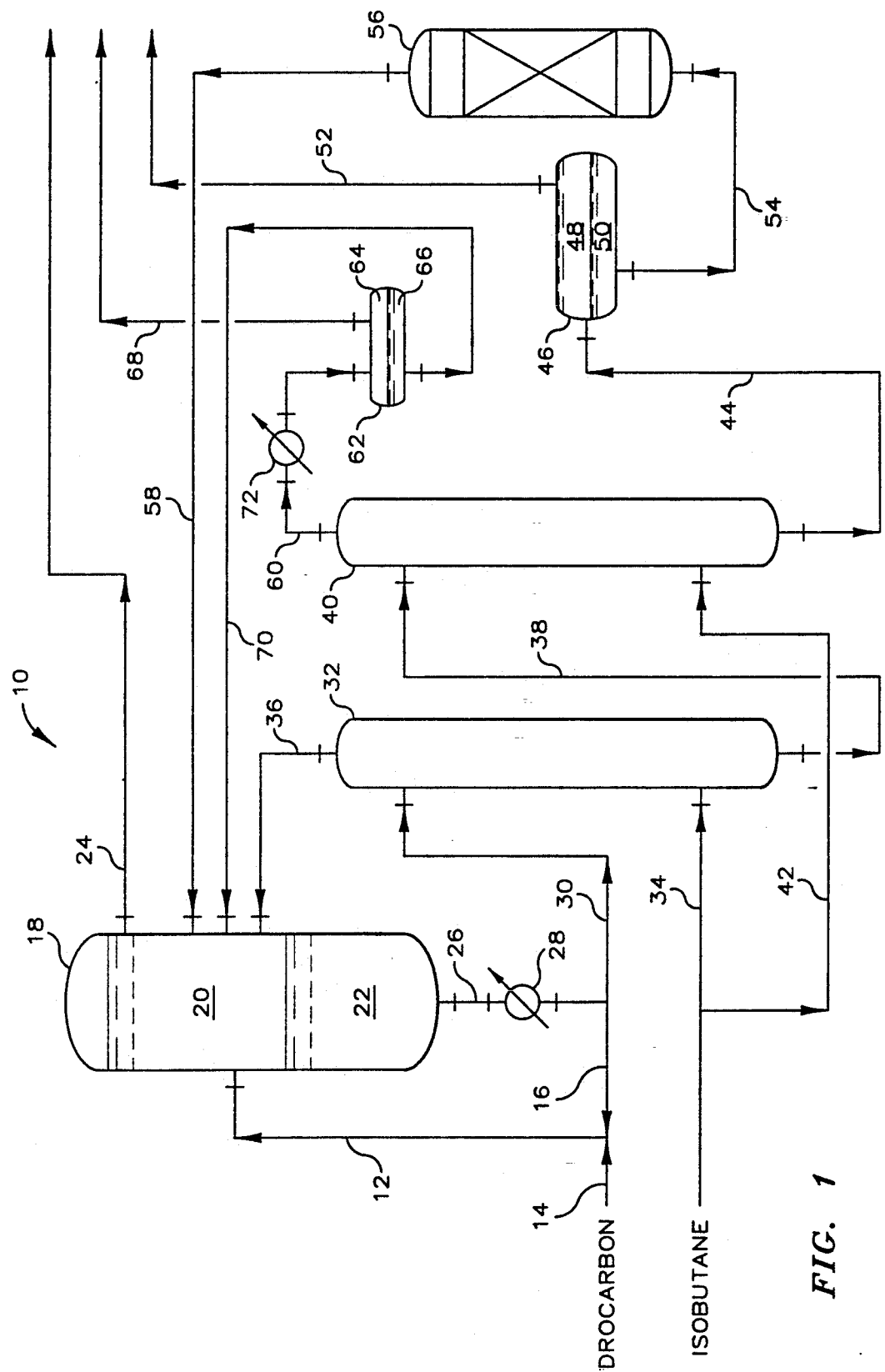
FIG. 1 provides a schematic representation of the process which is one embodiment of the invention.

Other objects and advantages of the invention will be apparent from the foregoing detailed description of the invention and the appended claims.

DETAILED DESCRIPTION OF THE INVENTION

Acid soluble oils are oils produced as a reaction by-product in an alkylation process comprising the step of contacting a hydrocarbon mixture, which comprises olefins and isoparaffins, with an alkylation catalyst, which can comprise, consist of, or consist essentially of a hydrogen halide component and a sulfone component. As referred to within this description and in the claims, the term "acid soluble oil", or "ASO", means those conjunct polymers which are highly olefinic oils produced by acid-catalyzed reactions of hydrocarbons. An extensive description and characterization of certain types of conjunct polymer oils is provided in the *Journal of Chemical and Engineering Data* article entitled "Molecular Structure of Conjunct Polymers", pages 150-160, Volume 8, Number 1, by Miron and Lee. This article is incorporated herein by reference. The physical properties of ASO depend upon the particular hydrocarbon feed processed, the catalyst utilized in the process, feed contaminants such as hydrogen sulfide, butadiene, oxygenates and other compounds, and the alkylation process reaction conditions. Thus, as the term is more narrowly defined herein, ASO will be those conjunct polymers produced as a by-product in the catalyzed reaction of mono-olefins with isoparaffins utilizing a catalyst mixture comprising, consisting of, or consisting essentially of a sulfone component and a hydrogen halide component. The preferred mono-olefins for use in the catalyzed reaction are those having from three to five carbon atoms and the preferred isoparaffins are those having from four to six carbon atoms. The preferred sulfone component is sulfolane and the preferred hydrogen halide component is hydrogen fluoride.

The ASO by-product derived from the hydrocarbon reaction catalyzed by a sulfone-containing alkylation catalyst can further be generally characterized as having a specific gravity, with water at 60° F. as the reference, in the range of from about 0.8 to about 1.0, an average molecular weight in the range of from about 250 to about 350, and a bromine number in the range of from about 40 to about 350.

The hydrogen halide component of the catalyst composition or catalyst mixture can be selected from the group of compounds consisting of hydrogen fluoride (HF), hydrogen chloride (HCl), hydrogen bromide (HBr), and mixtures of two or more thereof. The preferred hydrogen halide component, however, is hydrogen fluoride, which can be utilized in the catalyst composition in anhydrous form; but, generally, the hydrogen fluoride component utilized can have a small amount of water. In a catalyst composition including hydrogen fluoride and sulfolane, for example, the amount of water present in no event can be more than about 30 weight percent of the total weight of the hydrogen fluoride component, which includes the water. Preferably, the amount of water present in the hydrogen fluoride component is less than about 10 weight percent. Most preferably, the amount of water present in the hydrogen fluoride component is less than 7 weight percent. When referring herein to the hydrogen halide component, or more specifically, to the hydrogen fluoride component, of the catalyst composition of the invention, it should be understood that these terms mean that the hydrogen halide component is either an anhydrous mixture or a non-anhydrous mixture. The references herein to weight percent water contained in the hydrogen halide component means the ratio of the weight of water to the sum weight of the water and hydrogen halide multiplied by a factor of 100 to place the weight ratio in terms of percent.

The sulfones suitable for use in this invention are the sulfones of the general formula

wherein R and R' are monovalent hydrocarbon alkyl or aryl substituents, each containing from 1 to 8 carbon atoms. Examples of such substituents include dimethylsulfone, di-n-propylsulfone, diphenylsulfone, ethylmethylsulfone and the alicyclic sulfones wherein the $SO_2$ group is bonded to a hydrocarbon ring. In such a case, R and R' are forming together a branched or unbranched hydrocarbon divalent moiety preferably containing from 3 to 12 carbon atoms. Among the latter, tetramethylenesulfone or sulfolane, 3-methylsulfolane and 2,4-dimethylsulfolane are more particularly suitable since they offer the advantage of being liquid at process operating conditions of concern herein. These sulfones may also have substituents, particularly one or more halogen atoms, such as for example, chloromethylethylsulfone. These sulfones may advantageously be used in the form of mixtures.

The alkylation catalyst used in the alkylation process wherein an ASO reaction by-product is produced can comprise, consist of, or consist essentially of a hydrogen halide component as described herein and a sulfone component as described herein. Preferably, the ASO by-product will be produced in an alkylation process in which the hydrocarbon mixture is contacted with an alkylation catalyst having sulfolane as its sulfone component and hydrogen fluoride as its hydrogen halide component. In the case where the alkylation catalyst comprises a sulfone, which is preferably sulfolane, and a hydrogen halide, which is preferably hydrogen fluoride, good alkylation results can be achieved with a weight ratio of hydrogen halide to sulfone in the alkylation catalyst in the range of from about 1:1 to about 40:1. A preferred weight ratio of hydrogen halide to sulfone in the alkylation catalyst can range from about 2.3:1 to about 19:1 and, more preferably, it can range from 3:1 to 9:1.

To obtain the by-product ASO from an alkylation reaction effluent or product, any suitable means can be used to separate the by-product ASO from the alkylate product. One example of such suitable separation means is the allowance of a phase separation between the alkylation catalyst and the alkylate product, which is generally a mixture of highly branched paraffin hydrocarbons, other paraffin hydrocarbons and alkylate followed by the removal of ASO from the alkylation catalyst phase. Any suitable means can be used to recover the ASO from the alkylation catalyst.

Alkylation processes contemplated in the present invention are those liquid phase processes wherein mono-olefin hydrocarbons such as propylene, butylenes, pentylenes, hexylenes, heptylenes, octylenes and the like are alkylated by isoparaffin hydrocarbons such as isobutane, isopentane, isohexane, isoheptane, isooctane and the like for production of high octane alkylate hydrocarbons boiling in the gasoline range and which are suitable for use in gasoline motor fuel. Preferably, isobutane is selected as the isoparaffin reactant, and the olefin reactant is selected from propylene, butylenes, pentylenes and mixtures thereof for production of an alkylate hydrocarbon product comprising a major portion of highly branched, high octane value aliphatic hydrocarbons having at least seven carbon atoms and less than ten carbon atoms.

In order to improve selectivity of the alkylation reaction of the present invention toward the production of the desirable highly branched aliphatic hydrocarbons having seven or more carbon atoms, a substantial stoichiometric excess of isoparaffin hydrocarbon is desirable in the reaction zone. Molar ratios of isoparaffin hydrocarbon to olefin hydrocarbon of from about 2:1 to about 25:1 are contemplated in the present invention. Preferably, the molar ratio of isoparaffin-to-olefin will range from about 5 to about 20; and, most preferably, it shall range from 8 to 15. It is emphasized, however, that the above recited ranges for the molar ratio of isoparaffin-to-olefin are those which have been found to be commercially practical operating ranges; but, generally, the greater the isoparaffin-to-olefin ratio in an alkylation reaction, the better the resultant alkylate quality.

Alkylation reaction temperatures within the contemplation of the present invention are in the range of from about 0° F. to about 150° F. Lower temperatures favor alkylation reaction of isoparaffin with olefin over competing olefin side reactions such as polymerization. However, overall reaction rates decrease with decreasing temperatures. Temperatures within the given range, and preferably in the range from about 30° F. to about 130° F., provide good selectivity for alkylation of isoparaffin with olefin at commercially attractive reaction rates. Most preferably, however, the alkylation temperature should range from 50° F. to 120° F.

Reaction pressures contemplated in the present invention may range from pressures sufficient to maintain reactants in the liquid phase to about fifteen atmospheres of pressure. Reactant hydrocarbons may be normally gaseous at alkylation reaction temperatures, thus reaction pressures in the range of from about 40 pounds gauge pressure per square inch (psig) to about 160 psig are preferred. With all reactants in the liquid phase, increased pressure has no significant effect upon the alkylation reaction.

Contact times for hydrocarbon reactants in an alkylation reaction zone, in the presence of the alkylation catalyst of the present invention, generally should be sufficient to provide for essentially complete conversion of olefin reactant in the alkylation zone. Preferably, the contact time is in the range from about 0.05 minute to about 60 minutes. In the alkylation process of the present invention, employing isoparaffin-to-olefin molar ratios in the range of about 2:1 to about 25:1, wherein the alkylation reaction mixture comprises about 40-90 volume percent catalyst phase and about 60-10 volume percent hydrocarbon phase, and wherein good contact of olefin with isoparaffin is maintained in the reaction zone, essentially complete conversion of olefin may be obtained at olefin space velocities in the range of about 0.1 to about 200 volumes olefin per hour per volume catalyst (v/v/hr.). Optimum space velocities will depend upon the type of isoparaffin and olefin reactants utilized, the particular compositions of alkylation catalyst, and the alkylation reaction conditions. Consequently, the preferred contact times are sufficient for providing an olefin space velocity in the range of about 0.1 to about 200 (v/v/hr.) and allowing essentially complete conversion of olefin reactant in the alkylation zone.

The alkylation process may be carried out either as a batch or continuous type of operation, although it is preferred for economic reasons to carry out the process continuously. It has been generally established that in alkylation processes, the more intimate the contact between the feedstock and the catalyst the better the quality of alkylate product obtained. With this in mind, the present process, when operated as a batch operation, is characterized by the use of vigorous mechanical stirring or shaking of the reactants and catalyst.

In continuous operations, in one embodiment, reactants may be maintained at sufficient pressures and temperatures to maintain them substantially in the liquid phase and then continuously forced through dispersion devices into the reaction zone. The dispersion devices can be jets, nozzles, porous thimbles and the like. The reactants are subsequently mixed with the catalyst by conventional mixing means such as mechanical agitators or turbulence of the flow system. After a sufficient time, the product can then be continuously separated from the catalyst and withdrawn from the reaction system while the partially spent catalyst is recycled to the reactor. As described herein, a portion of the catalyst can be continuously regenerated or reactivated by any suitable treatment and returned to the alkylation reactor.

The process of this invention contemplates the resolution of problems associated with the regeneration of sulfone-containing alkylation catalyst mixtures by the removal of at least a portion of the ASO contained within such mixtures. The accumulation of ASO in sulfone-containing alkylation catalysts occurs when an alkylation process continuously reuses its catalyst. In a continuous alkylation process, the ASO reaction by-product will build up in the catalyst until, if not removed, it reaches unacceptable concentration levels that can have negative effects upon the catalyst performance and, ultimately, the alkylation product quality. It is generally desirable to maintain the concentration of ASO in the sulfone-containing alkylation catalyst at no more than about 20 weight percent of the catalyst with the weight percent ASO being based upon the total weight of the catalyst mixture exclusive of the ASO component. Preferably, the concentration of the ASO in the sulfone-containing alkylation catalyst is less than about 15 weight percent, and most preferably, the concentration of ASO is less than 10 weight percent. There may be some process advantages in maintaining a low concentration of ASO in the sulfone-containing catalyst mixture, but it is believed that an ASO concentration exceeding about 10 weight percent of the catalyst will have a detrimental effect upon the catalyst performance.

Thus, in order to maintain the catalytic activity of a sulfone-containing alkylation catalyst mixture, the catalyst must be processed to remove at least a portion of the ASO contained within such catalyst. To achieve this, one alternative is to contact the sulfone-containing alkylation catalyst mixture with an absorbent material so as to remove at least a portion of the ASO component of the sulfone-containing alkylation catalyst mixture. It is noted, however, that it is generally desirable, if not essential, to have at least a portion of the hydrogen halide component of the sulfone-containing alkylation catalyst mixture removed prior to contacting the resultant mixture with the adsorbent material to thereby remove at least a portion of the ASO component. Therefore, the resultant mixture to be contacted with the adsorbent material will be the sulfone-containing alkylation catalyst mixture having at least a portion, preferably a major portion, of the hydrogen halide component removed prior to such contacting.

Any suitable method can be used to separate the hydrogen halide component from the sulfone-containing alkylation catalyst mixture, such as, for example, flash separation, distillation, extraction, stripping, and other suitable separation methods. One preferred method is by stripping means for separating the mixture into a first overhead stream, comprising at least a portion, preferably a major portion, of the hydrogen halide component of the mixture, and a first bottoms stream, comprising at least a portion, preferably a major portion, of the sulfone component of the mixture and at least a portion, preferably a major portion, of the ASO of the mixture, with the use of vaporous butane, which is preferably isobutane, as the stripping agent.

Generally, the concentration of the hydrogen halide component in the first bottoms stream will be less than about 10 weight percent of the first bottoms stream with the weight percent determined by the weight fraction of the hydrogen halide to the sum total weight of the first bottoms stream multiplied by a factor of 100 to yield a percent. Preferably, the first bottoms stream will have a concentration of hydrogen halide of less than about 5 weight percent and, most preferably, the hydrogen halide concentration is less than 2 weight percent. Because it is difficult to remove the entire amount of hydrogen halide by stripping means from the mixture, the lower limit of hydrogen halide concentration in the first bottoms stream, from a practical standpoint, can approach about 0.1 weight percent, but, preferably, the concentration can be less than 0.1 weight percent. Thus, the concentration range of hydrogen halide in the mixture can range from about 0.1 weight percent to about 10 weight percent. Preferably, however, the concentration can range from about 0.1 to about 5 weight percent, and most preferably, it can range from 0.1 to 2 weight percent.

Figure 2:
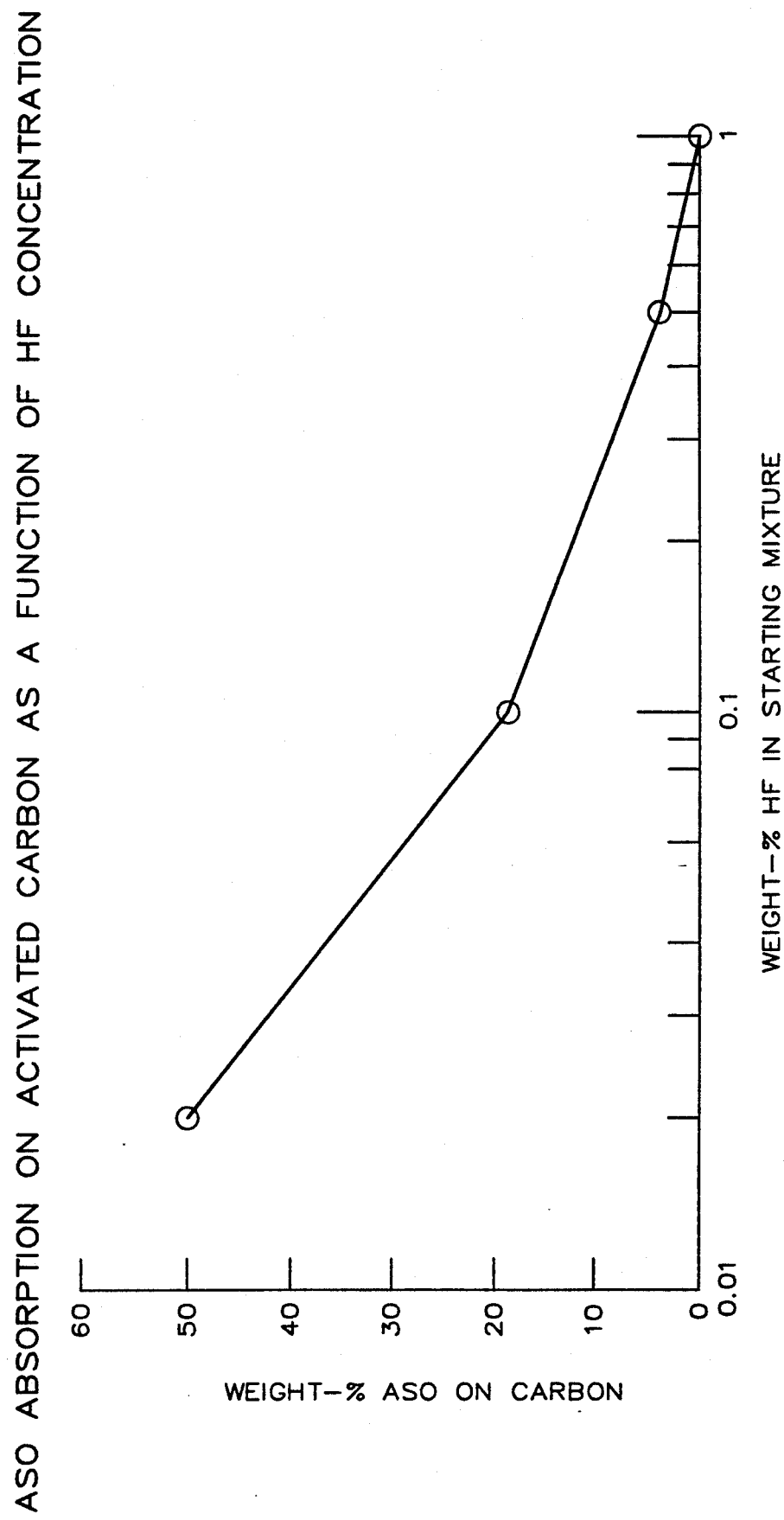
FIG. 2 is a plot demonstrating the capacity of an activated carbon to adsorb ASO from a sulfone-containing mixture as a function of the weight percent HF contained in such mixture.

It has been determined that the presence of even a small concentration of a hydrogen halide compound, particularly hydrogen fluoride, in an ASO contaminated sulfone-containing mixture has the effect of reducing the ability of an activated carbon adsorbent to selectively remove ASO from the sulfone-containing mixture when it is contacted with the activated carbon. As illustrated by the data presented in FIG. 2, a small concentration of hydrogen fluoride in a sulfone-containing mixture being contacted with an activated carbon material can have the effect of essentially rendering the carbon ineffective for ASO removal. Thus, one important, and potentially critical, aspect of this invention is for an ASO contaminated sulfone-containing mixture to be substantially free of a concentration of hydrogen halide when contacting the mixture with a carbon material.

A single separation step for removing hydrogen halide from an ASO contaminated sulfone-containing mixture, generally, however, is not able to separate a significant enough quantity of the hydrogen halide contained in the sulfone-containing alkylation catalyst mixture to give a low enough concentration of hydrogen halide in the resultant sulfone-containing mixture to allow a carbon material to effectively remove ASO from the sulfone-containing mixture. Thus, it is generally necessary for the first bottoms stream of the aforedescribed separation step to undergo a second separation step in which a second overhead stream and a second bottoms stream are produced. Any suitable method can be used to separate the hydrogen halide contained in the bottoms stream, such as, for example, flash separation, distillation, extraction, stripping, and other suitable separation methods. One preferred method is by stripping means for separating the first bottoms stream into the second overhead stream, comprising at least a portion, preferably a major portion, of the hydrogen halide of the bottoms stream, and a second bottoms stream, comprising at least a portion, preferably a major portion, of the sulfone contained in the bottoms stream and at least a portion, preferably a major portion, of the ASO contained in the bottoms stream. The method of stripping the hydrogen halide from the first bottoms stream can use vaporous butane, which is preferably isobutane, as the stripping agent.

Generally, the concentration of the hydrogen halide component in the second bottoms stream will be less than about 1 weight percent of the second bottoms stream with the weight percent determined by the weight fraction of the hydrogen halide to the sum total weight of the second bottoms stream multiplied by a factor of 100 to yield a percent. Preferably, the second bottoms stream will have a concentration of hydrogen halide of less than about 0.5 weight percent and, most preferably, the hydrogen halide concentration is less than 0.25 weight percent.

The second bottoms stream can be further separated into an ASO stream and a sulfone stream. Any suitable method can be used to separate at least a portion of the sulfone contained in the second bottoms stream to give the sulfone stream comprising at least a portion of the sulfone of the second bottoms stream and the ASO stream comprising ASO. It has been found, as an example, that when hydrogen halide is present in a mixture of sulfone and hydrogen halide in extremely low quantities or at very low concentrations, preferably less than about 0.5 weight percent of a sulfone and ASO mixture and, most preferably, less than 0.25 weight percent, ASO and certain sulfones are immiscible when both are in the liquid phase. Therefore, if a significant amount of the hydrogen halide component of the aforedescribed sulfone, hydrogen halide and ASO mixture is removed therefrom, a liquid-liquid phase separation between ASO and the sulfone can be achieved. Generally, therefore, for a liquid-liquid phase separation to be effected between a liquid ASO phase and liquid sulfone phase, hydrogen halide present in the mixture before phase separation must be less than about 30 weight percent, otherwise, at hydrogen halide concentrations greater than about 30 weight, the ASO and sulfone essentially will form a single liquid phase. Thus, if the amount of hydrogen halide present is significantly low enough, the separate ASO phase will have an ASO concentration of more than 65 weight percent of the separate ASO phase and a sulfone concentration of less than 35 weight percent of the separate ASO phase. As for the separate sulfone phase, it will have a sulfone concentration of more than 75 weight percent of the sulfone phase and an ASO concentration of less than 25 weight percent of the sulfone phase. Preferably, the ASO present in the ASO phase is greater than 80 weight percent and the concentration of sulfone in the ASO phase is less than 20 weight percent. The preferred sulfone concentration in the sulfone phase is greater than 80 weight percent and the concentration of ASO is less than 20 weight percent. Most preferably, the ASO in the ASO phase is greater than 90 weight percent, the sulfone in the ASO phase is less than 10 weight percent, the sulfone in the sulfone phase is greater than 85 weight percent and the ASO in the sulfone phase is less than 15 weight percent.

The removal by at least one separation step of a substantial portion of the hydrogen halide component of the sulfone-containing alkylation catalyst to give an ASO contaminated sulfone-containing mixture such as the aforedescribed separate sulfone phase, or sulfone stream, permits the use of an activated carbon adsorbent material for removing at least a portion, preferably a substantial portion, of the ASO contained in the sulfone stream by contacting it with the adsorbent material to produce a sulfone stream having a reduced concentration of ASO. It is desirable for the step of contacting the sulfone stream with an adsorbent to result in the removal of at least about 75 weight percent of the ASO contained in the sulfone stream. Preferably, however, at least about 85 weight percent of ASO contained in the sulfone stream can be removed from the sulfone stream and, most preferably, at least 95 weight percent of the ASO can be removed. Thus, the ASO component of the sulfone stream will, in most instances, be present at a concentration of less than about 2 weight percent of the total weight of the sulfone stream. Preferably, the weight percent of ASO present in the sulfone stream can be less than about 1.0, and most preferably, the ASO will be present in an amount less than 0.1 weight percent. The sulfone stream having a reduced concentration of ASO can be reused as a portion of a sulfone-containing alkylation catalyst mixture comprising, consisting of, or consisting essentially of a sulfone and a hydrogen halide.

Generally, the adsorbent material contemplated for use by this invention can be contained within a vessel defining a contacting zone in which the sulfone stream can be contacted with the adsorbent material to thereby remove at least a portion, preferably a major portion, of the ASO contained in the sulfone stream. However, this invention is not confined to the use of standard vessels for defining a contacting zone, but any suitable means known in the art can be utilized for contacting the sulfone stream with the adsorbent material.

The adsorbent material utilized to remove ASO from the sulfone stream can be any adsorbent which can either suitably or effectively remove at least a portion of the ASO component contained in such mixture. Preferably, the adsorbent material is carbon or activated carbon.

The carbon adsorbent material can be any activated carbon material that is suitable for use as contemplated by this invention and for the selective removal of at least a portion of the ASO component contained in the sulfone stream. The activated carbon adsorbent can be characterized by its large specific surface area which can range from about 300 $m^2/g$ to about 2500 $m^2/g$ as determined by the American Society for Testing Materials (ASTM) Standard Test Method D3663-84 entitled "Standard Test Method for Surface Area of Catalysts". The standard ASTM test D3663-84 is incorporated herein and made a part hereto by reference. Also, the activated carbon adsorbent can further be characterized by its pore diameter which can range from about 10 $\mu$m to about 50 $\mu$m as determined by the method of mercury intrusion prosimetry described by ASTM Standard Test D4284-88 entitled "Standard Test Method for Determining Pore Volume Distribution of Catalysts by Mercury Intrusion Porosimetry". The standard ASTM test D4284-88 is incorporated herein and made a part hereto by reference. It is generally desirable to use commercially available activated carbon. One such suitable commercially available activated carbon, for example, is the product known by its tradename as Calgon Filtrasorb 400, which is manufactured and marketed by Calgon Carbon Corporation.

The process conditions under which a sulfone stream is contacted with an absorbent composition can be any conditions that are suitable or effective for removing at least a portion of the concentration of ASO from the sulfone stream which can comprise a sulfone component and ASO. The removal efficiency of the adsorbent material is not believed to be highly dependent upon the contact pressure because the adsorption phenomenon is thought to be the result of a liquid-solid interaction; however, the process pressure should exceed about 0.5 atmospheres of absolute pressure and can range upwardly to about 30 atmospheres, or more, of absolute pressure. The more common operating pressure will generally range from about atmospheric pressure to about 200 pounds per square inch of gauge pressure (psig).

As for the contacting temperature, any suitable temperature can be utilized that provides for an effective removal of at least a portion of the ASO from the sulfone stream. Generally, the upper and lower temperature limits are set by the physical characteristics of the mixture being treated and the physical characteristics of the ASO contained in such mixture. Considering the lower temperature limit, pure sulfolane has a melting point of about 81.3°-82.0° F., but when sulfolane is in the form of a mixture with water and hydrogen fluoride, the melting point is significantly lower. Therefore, the lower limit for the contacting temperature approximates 0° F. As for the upper temperature limit, it is determined by such factors as the initial boiling temperature of the ASO and the temperature at which the sulfone component of the mixture begins to thermally decompose. Thus, the upper contacting temperature approximates 400° F. Therefore, the contact temperature generally will range from about 0° F. to about 400° F. Preferably, the contacting temperature will range from about 50° F. to about 350° F., and most preferably, it will range from 60° F. to 325° F.

Now referring to FIG. 1, there is depicted by schematic representation an alkylation process 10. A hydrocarbon feed mixture, comprising olefins and isoparaffins, is introduced into reactor-riser 12 through conduit 14. Reactor-riser 12 defines a reaction zone wherein the hydrocarbon mixture is contacted, or admixed, with a catalyst mixture, comprising sulfolane and hydrogen fluoride, in order to produce a reaction product and a reaction by-product. the olefins of the hydrocarbon feed mixture generally comprise one or more olefins having from three to five carbon atoms, and the isoparaffins of the hydrocarbon feed mixture generally will have from four to six carbon atoms. The catalyst mixture is introduced into reactor-riser 12 via conduit 16. The admixture of hydrocarbon feed mixture and catalyst mixture passes through the reaction zone defined by reactor-riser 12 wherein a reaction takes place in which the olefins of the hydrocarbon feed mixture react with isoparaffins of the hydrocarbon feed mixture to produce an alkylate reaction product. Also, within the reaction zone, the reaction by-product, ASO, is formed. The reaction effluent from reactor-riser 12 passes to settler vessel 18, which defines a separation zone for separating the alkylate reaction product from the catalyst mixture to produce a separated reaction product 20 and a separated catalyst mixture 22. The separated catalyst mixture 22 will contain a substantial amount of the alkylation reaction by-product, ASO. The separated reaction product 20 passes to downstream processing via conduit 24. The separated catalyst mixture 22 can be recycled via conduits 26 and 16 to reactor-riser 12 for reuse as the alkylation catalyst mixture. Interposed in conduit 26 is catalyst cooler 28, which defines a heat transfer zone for exchanging heat from separated catalyst mixture 22 to a heat transfer fluid such as water.

At least a portion, sometimes referred to as a slip stream or a drag stream, of the separated catalyst mixture 22 passes by way of conduit 30 to first stripping column 32, which defines a first separation zone and provides a first separation means for separating the slip stream of separated catalyst mixture 22 into a first overhead stream, comprising at least a portion of the hydrogen fluoride contained in the slip stream, or mixture, and a first bottoms stream, comprising at least a portion of the sulfolane component of the mixture. The first bottoms stream can also contain at least a portion of the reaction by-product, ASO, contained in the mixture. Introduced by way of conduit 34 is vaporous isobutane for stripping the hydrogen fluoride from the mixture. The first overhead stream passes by way of conduit 36 to settler vessel 18 wherein the hydrogen fluoride is recombined with the separated catalyst mixture 22 for reuse, and the stripping isobutane is combined with the separated reaction product 20.

The first bottoms stream from stripping column 32 passes by way of conduit 38 to second stripping column 40, which defines a second separation zone and provides second separation means for separating the first bottoms stream into a second overhead stream, comprising at least a portion of the hydrogen fluoride contained in the first bottoms stream, and a second bottoms stream, comprising at least a portion of the sulfolane contained in the first bottoms stream and at least a portion of the ASO contained in the first bottoms stream. Through conduits 34 and 42, vaporous isobutane is introduced into second stripping column 40 to provide for stripping the hydrogen fluoride from the first bottoms streams.

The second bottoms stream passes from second stripping column 40 by way of conduit 44 to phase separator 46, which defines a third separation zone and provides third separation means for separating the second bottoms stream into an ASO phase 48 to give an ASO stream and sulfolane phase 50 to give a sulfolane stream. The ASO stream passes to downstream processing by way of conduit 52. The sulfolane stream passes from phase separator 46 through conduit 54 to contacting vessel 56 containing therein an adsorbent material that is preferably activated carbon. Contacting vessel 56 defines a contacting zone and provides contacting means for contacting the sulfolane stream with an adsorbent such as carbon to thereby remove at least a portion of the ASO contained in the sulfolane stream to produce a sulfolane stream having a reduced concentration of ASO. The sulfolane stream having a reduced concentration of ASO passes by way of conduit 58 to settler vessel 18 wherein it is recombined with the separated catalyst mixture 22 for reuse. The second overhead stream passes from stripping column 40 by way of conduit 60 to overhead accumulator 62 which defines a separation zone and defines separation means for separating a hydrocarbon phase 64 from a hydrogen fluoride phase 66. Hydrocarbon phase 64 passes from overhead accumulator 62 by way of conduit 68 for further processing downstream. Hydrogen fluoride phase 66 passes from overhead accumulator 62 through conduit 70 to settler vessel 18 wherein it is recombined with separated catalyst mixture 22 for reuse. Interposed in conduit 60 is overhead condenser 72 which defines a heat transfer zone and provides means for exchanging heat from second overhead stream and means for condensing the second overhead stream.

The following examples demonstrate the advantages of the present invention. These examples are by way of illustration only, and are not intended as limitations upon the invention as set out in the appended claims.

EXAMPLE I

This Example I generally describes the experimental method used to obtain data relating to the ability of carbon to absorb ASO from sulfolane which contains a concentration of ASO.

The general experimental procedure for testing the use of the materials of carbon in the recovery of ASO from a sulfolane-containing mixture of sulfolane and ASO included the use of a glass cylinder of approximately one inch in diameter and from 12 inches to 24 inches in length. Placed in the bottom of the cylinder was either glass wool or glass beads to provide support for the active material, and on top of the active material was placed either glass beads or glass wool to assist in providing an even distribution of the sulfolane-containing mixture over the active material. Heat was optionally provided to the glass cylinder to induce the flow of the sulfolane-containing mixture through the bed of active material. The sulfolane-containing mixture had a weight ratio of sulfolane-to-ASO of approximately 9 to 1. The color of the resultant filtrate provided an indication as to when the adsorption capacity of the active material was spent and thus was monitored to determine when the experiment was complete.

EXAMPLE II

This Example II illustrates the unexpected relationship between the capacity of activated carbon to adsorb ASO from a sulfolane-containing mixture of sulfolane and ASO as a function of the concentration of hydrogen fluoride in the sulfolane-containing mixture.

The experimental method used to obtain the data presented in Table I is substantially similar to that described in Example I. Various concentrations of hydrogen fluoride in the sulfolane-containing mixture were established before contacting the mixture with an activated carbon material. The data obtained are presented in Table I, which unexpectedly demonstrates that the level of acid concentration in the sulfolane-containing mixture has a large impact upon the ASO adsorption capacity of activated carbon. These data are also plotted in FIG. 2.

TABLE I

The capacity of activated carbon to adsorb ASO from a sulfolane-containing mixture, having a ratio of sulfolane to ASO of 9 to 1, as a function of HF concentration.

| Concentration of HF in sulfolane-containing Mixture Weight % HF | Adsorption Capacity of Carbon Weight % ASO on Carbon |
| --- | --- |
| 0.02 | 50 |
| 0.10 | 19 |
| 0.50 | 4 |
| 1.00 | Nil |

While this invention has been described in terms of the presently preferred embodiment, reasonable variations and modifications are possible by those skilled in the art. Such variations and modifications are within the scope of the described invention and the appended claims.

That which is claimed is:

1. A process comprising:

separating a mixture, comprising a sulfone component, a hydrogen halide component, and acid soluble oil, hereinafter abbreviated as ASO, into a first overhead stream and a first bottoms stream wherein said first overhead stream comprises at least a portion of the hydrogen halide component of said mixture and said first bottom stream comprises at least a portion of said sulfone component of said mixture and at least a portion of said ASO of said mixture;

separating said first bottoms stream into a second overhead stream and a second bottoms stream wherein said second overhead stream comprises at least a portion of the hydrogen halide contained in said first bottoms stream and wherein said second bottoms stream comprises at least a portion of said sulfone contained in said first bottoms stream and at least a portion of said ASO contained in said first bottoms stream;

separating said second bottoms stream into an ASO stream and a sulfone stream wherein said sulfone stream comprises at least a portion of the sulfone contained in said second bottoms stream and said ASO stream comprises ASO; and contacting said sulfone stream with carbon to thereby remove at least a portion of the ASO contained in said sulfone stream to produce a sulfone stream having a reduced concentration of ASO.

2. A process as recited in claim 1, wherein the weight ratio of the hydrogen halide component to the sulfone component of said mixture is in the range of from about 1:1 to about 40:1.

3. A process as recited in claim 1, wherein ASO is present in said mixture at a concentration of no more than about 20 weight percent of said mixture exclusive of the ASO component.

4. A process as recited in claim 1, wherein said first bottoms stream has a concentration of hydrogen halide of less than about 10 weight percent.

5. A process as recited in claim 1, wherein said second bottoms stream has a concentration of hydrogen halide of less than about 1 weight percent.

6. A process as recited in claim 1, wherein said at least a portion of the ASO contained in said sulfone stream is at least about 75 weight percent of the ASO contained in said sulfone stream.

7. A process as recited in claim 1, wherein said sulfone stream has a concentration of sulfone greater than about 75 weight percent and said ASO stream has a concentration of ASO greater than about 65 weight percent.

8. A process as recited in claim 1, further comprising:
utilizing said sulfone stream having a reduced concentration of ASO as at least a portion of a catalyst mixture, wherein said catalyst mixture comprises a sulfone component and a hydrogen halide component; and
contacting a hydrocarbon mixture, comprising olefins and isoparaffins, with said catalyst mixture within a reaction zone to thereby produce an alkylation reaction mixture, comprising an alkylate product and ASO.

9. A process as recited in claim 8, further comprising:
separating said alkylate product from said catalyst mixture within a separation zone to produce a separated catalyst mixture, containing at least a portion of the ASO produced by said contacting step of claim 8; and
utilizing said separated catalyst mixture as at least a portion of said mixture.

10. A process comprising:
separating a mixture into a first overhead stream and a first bottoms stream, wherein:
said mixture comprises hydrogen fluoride and sulfolane present at a weight ratio of hydrogen fluoride to sulfolane in the range of from about 1:1 to about 40:1 and having a concentration of ASO at no more than about 20 weight percent of the sulfolane component of said mixture exclusive of the ASO component,
said first bottoms stream comprises at least a portion of the sulfolane of said mixture, at least a portion of the ASO of said mixture, and a concentration of hydrogen fluoride of less than about 10 weight percent of said first bottoms stream, and
said first overhead stream comprises at least a portion of the hydrogen fluoride of said mixture;

separating said first bottoms stream into a second overhead stream and a second bottoms stream, wherein:
said second bottoms stream comprises at least a portion of the sulfolane of said first bottoms stream, at least a portion of the ASO of said first bottoms stream, and a concentration of hydrogen fluoride of less than about 1 weight percent of said second bottoms stream, and
said second overhead stream comprises at least a portion of the hydrogen fluoride of said first bottoms stream;

separating said second bottoms stream into an ASO stream and a sulfolane stream, wherein:
said sulfolane stream comprise a concentration of sulfolane greater than about 75 weight percent of said sulfolane stream, and
said ASO stream comprises a concentration of ASO greater than about 65 weight percent of said ASO stream; and contacting said sulfolane stream with carbon to thereby remove at least about 75 weight percent of the ASO contained in said sulfolane stream to produce a sulfolane stream having a reduced concentration of ASO.

11. A process as recited in claim 10, further comprising:
utilizing said sulfolane stream having a reduced concentration of ASO as at least a portion of a catalyst mixture, comprising sulfolane and HF; and
contacting a hydrocarbon mixture, comprising olefins and isoparaffins, with said catalyst mixture within a reaction zone to thereby produce an alkylation reaction mixture, comprising an alkylate product and ASO.

12. A process as recited in claim 11, further comprising:
separating said alkylate product from said catalyst mixture within a separation zone to produce a separated catalyst mixture, comprising a substantial amount of the ASO produced by said contacting step of claim 11; and
utilizing said separated catalyst mixture as at least a portion of said mixture.

13. A process as recited in claim 10, wherein:

said weight ratio of hydrogen fluoride to sulfolane in said mixture is in the range of from about 2.3:1 to about 19:1;

said concentration of ASO in said mixture is no more than about 15 weight percent of the sulfolane component of said mixture exclusive of the ASO component;

said concentration of hydrogen fluoride in said first bottoms stream is less than about 5 weight percent of said first bottoms stream;

said concentration of hydrogen fluoride in said second bottoms stream is less than about 0.5 weight percent of said second bottoms stream;

said concentration of sulfolane in said sulfolane stream is greater than about 80 weight percent of said sulfolane stream;

said concentration of ASO in said ASO stream is greater than about 80 weight percent of said ASO stream; and the amount of ASO removed by contacting said sulfolane stream with carbon is at least about 85 weight percent of the ASO contained and said sulfolane stream.

14. A process as recited in claim 10, wherein:

said weight ratio of hydrogen fluoride to sulfolane in said mixture is in the range of from about 3:1 to about 9:1;

said concentration of ASO in said mixture is no more than about 10 weight percent of the sulfolane component of said mixture exclusive of the ASO component;

said concentration of hydrogen fluoride in said first bottoms stream is less than about 2 weight percent of said first bottoms stream;

said concentration of hydrogen fluoride in said second bottoms stream is less than about 0.25 weight percent of said second bottoms stream;

said concentration of sulfolane in said sulfolane stream is greater than about 85 weight percent of said sulfolane stream;

said concentration of ASO in said ASO stream is greater than about 90 weight percent of said ASO stream; and the amount of ASO removed by contacting said sulfolane stream with carbon is at least about 95 weight percent of the ASO contained and said sulfolane stream.

15. A process as recited in claim 13, further comprising:

utilizing said sulfolane stream having a reduced concentration of ASO as at least a portion of a catalyst mixture, comprising sulfolane and HF; and contacting a hydrocarbon mixture, comprising olefins and isoparaffins, with said catalyst mixture within a reaction zone to thereby produce an alkylation reaction mixture, comprising an alkylate product and ASO.

16. A process as recited in claim 14, further comprising:

separating said alkylate product from said catalyst mixture within a separation zone to produce a separated catalyst mixture, comprising a substantial amount of the ASO produced by said contacting step of claim 13; and utilizing said separated catalyst mixture as at least a portion of said mixture.

17. A process as recited in claim 14, further comprising:

utilizing said sulfolane stream having a reduced concentration of ASO as at least a portion of a catalyst mixture, comprising sulfolane and HF; and contacting a hydrocarbon mixture, comprising olefins and isoparaffins, with said catalyst mixture within a reaction zone to thereby produce an alkylation reaction mixture, comprising an alkylate product and ASO.

18. A process as recited in claim 17, further comprising:

separating said alkylate product from said catalyst mixture within a separation zone to produce a separated catalyst mixture, comprising a substantial amount of the ASO produced by said contacting step of claim 17; and utilizing said separated catalyst mixture as at least a portion of said mixture.

19. An alkylation process, comprising the steps of:

contacting a hydrocarbon mixture, comprising olefins and isoparaffins, with a catalyst mixture, comprising sulfolane and HF, within a reaction zone to thereby produce a reaction product and a reaction by-product;

separating said reaction product from said catalyst mixture within a first separation zone to produce a separated reaction product and a separated catalyst mixture with said separated catalyst mixture containing a substantial portion of said reaction by-product;

passing at least a portion of said separated catalyst mixture to a second separation zone to thereby separate said at least a portion of said separated catalyst mixture into a second separation zone overhead stream, comprising a major portion of the HF component of said at least a portion of said separated catalyst mixture, and a second separation zone bottoms stream, comprising a major portion of the sulfolane component of said at least a portion of said separated catalyst mixture and a major portion of the reaction by-product component of said at least a portion of said separated catalyst mixture;

passing said second separation zone bottoms stream to a third separation zone to thereby separate said second separation zone bottoms stream into a third separation zone overhead stream, comprising a major portion of the HF component of said second separation zone bottoms stream, and a third separation zone bottoms stream, comprising a major portion of the sulfolane component of said second separation zone bottoms stream and a major portion of the reaction by-product component of said second separation zone bottoms stream;

separating at least a portion of the reaction by-product component of said third separation zone bottoms stream therefrom to produce a separated reaction by-product stream and a sulfolane stream, said sulfolane stream comprising sulfolane;

optionally utilizing a remaining portion of said separated catalyst mixture as at least a portion of said catalyst mixture;

utilizing said second separation zone overhead steam as at least a portion of the HF component of said catalyst mixture;

contacting said sulfolane stream with carbon to thereby remove a substantial portion of the reaction by-product contained therein to produce a sulfolane stream substantially free of said reaction by-product; and utilizing said sulfolane stream substantially free of said reaction by-product as at least a portion of the sulfolane component of said catalyst mixture.

* * * * *